US012693008B2

(12) United States Patent
Wang et al.

(10) Patent No.: US 12,693,008 B2
(45) Date of Patent: Jul. 28, 2026

(54) FAN LAMP

(71) Applicants: SUZHOU OPPLE LIGHTING CO., LTD., Suzhou City (CN); OPPLE LIGHTING CO., LTD., Shanghai (CN)

(72) Inventors: Yaohai Wang, Suzhou City (CN); Guobao Zhang, Suzhou City (CN); Xiaolei Wang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 19/173,558

(22) Filed: Apr. 8, 2025

(65) Prior Publication Data

US 2025/0237377 A1 Jul. 24, 2025

Related U.S. Application Data

(63) Continuation of application No. PCT/CN2023/123599, filed on Oct. 9, 2023.

(51) Int. Cl.
*F21V 33/00* (2006.01)
*F04D 25/06* (2006.01)
(Continued)

(52) U.S. Cl.
CPC ........ *F21V 33/0096* (2013.01); *F04D 25/064* (2013.01); *F04D 25/088* (2013.01);
(Continued)

(58) Field of Classification Search
CPC .. F21V 33/0096; F21V 17/164; F21V 23/006; F04D 25/064; F04D 25/088; F04D 29/644; F21Y 2105/18; F21Y 2115/10
See application file for complete search history.

(56) References Cited

U.S. PATENT DOCUMENTS 9,901,039 B1 * 2/2018 Dellerson ............. F04D 27/007
2006/0285310 A1 * 12/2006 Shyu ..................... F04D 25/088 362/147

(Continued)

FOREIGN PATENT DOCUMENTS

CN 202581023 U 12/2012
CN 210951030 U 7/2020

(Continued)

OTHER PUBLICATIONS

International Search Report issued in PCT Application No. PCT/CN2023/123599 dated Dec. 22, 2023, (6p).

*Primary Examiner* — Bao Q Truong
(74) *Attorney, Agent, or Firm* — Arch & Lake LLP; Hao Tan; Shen Wang

(57) ABSTRACT

A fan lamp includes a driving mechanism, a lamp panel, a driving circuit board, and light sources. The driving mechanism is used for driving the fan lamp to rotate; the lamp panel is connected to the driving mechanism; the driving circuit board is mounted on the side of the lamp panel facing the driving mechanism; the light sources are used for illumination and are mounted on the side of the lamp panel facing away from the driving mechanism; and the driving circuit board is used for driving the light sources and the driving mechanisms to be turned on/off.

10 Claims, 4 Drawing Sheets

(51) Int. Cl.

| | |
|---|---|
| ***F04D 25/08*** | (2006.01) |
| ***F04D 29/64*** | (2006.01) |
| ***F21V 17/16*** | (2006.01) |
| ***F21V 23/00*** | (2015.01) |
| *F21Y 105/18* | (2016.01) |
| *F21Y 115/10* | (2016.01) |

(52) U.S. Cl.
CPC .......... *F04D 29/644* (2013.01); *F21V 17/164* (2013.01); *F21V 23/006* (2013.01); *F21Y 2105/18* (2016.08); *F21Y 2115/10* (2016.08)

(56) References Cited

U.S. PATENT DOCUMENTS

| | | | | |
|---|---|---|---|---|
| 2016/0169503 | A1* | 6/2016 | Chen ..................... | F04D 25/088<br>362/382 |
| 2020/0362878 | A1 | 11/2020 | Li | |
| 2020/0400162 | A1* | 12/2020 | He .......................... | F21V 23/04 |
| 2021/0102548 | A1* | 4/2021 | Tsung-Wei .......... | F04D 25/0646 |
| 2022/0120286 | A1 | 4/2022 | Chen et al. | |
| 2023/0266000 | A1 | 8/2023 | Chen et al. | |

FOREIGN PATENT DOCUMENTS

| | | | |
|---|---|---|---|
| CN | 111997925 | A | 11/2020 |
| CN | 111997926 | A | 11/2020 |
| CN | 212867980 | U | 4/2021 |
| CN | 113958527 | A | 1/2022 |
| CN | 215489382 | U | 1/2022 |
| CN | 216342958 | U | 4/2022 |
| CN | 115654449 | A | 1/2023 |
| CN | 218844626 | U | 4/2023 |

* cited by examiner

FAN LAMP

CROSS-REFERENCE TO RELATED APPLICATIONS

The present application is based upon and claims the priority of PCT patent application No. PCT/CN2023/123599 filed on Oct. 9, 2023 claims the priority of the Chinese patent application with application Ser. No. 202222647170.1, filed on Oct. 9, 2022, and the Chinese patent application with application Ser. No. 202211231318.1, filed on Oct. 9, 2022, the entire contents of which are hereby incorporated by reference herein for all purposes.

TECHNICAL FIELD

The present disclosure relates to the field of lighting technology, and in particular to a fan lamp.

BACKGROUND

Fan lamp uses an electric motor to drive fan blades to rotate and uses a light source for illumination.

SUMMARY

The present disclosure provides a fan lamp that may include: a driving mechanism that is configured to drive the fan lamp to rotate; a lamp panel that may be connected to the driving mechanism; a driving circuit board that may be mounted on a side of the lamp panel facing towards the driving mechanism; and a light source that may be configured for illumination, the light source may be mounted on a side of the lamp panel facing away from the driving mechanism; and the driving circuit board may be configured to drive the light source and the driving mechanism to be turned on and turned off.

It is to be understood that both the foregoing general description and the following detailed description are exemplary and explanatory only and are not restrictive of the present disclosure.

BRIEF DESCRIPTION OF DRAWINGS

In order to explain the technical solutions in the present disclosure more clearly, the drawings that need to be used in the description of the examples will be introduced briefly as below. The drawings in the following description are part of the examples of the present disclosure. For those of ordinary skill in the art, other drawings can be obtained based on these drawings without creative efforts.

DETAILED DESCRIPTION

Figure 1:
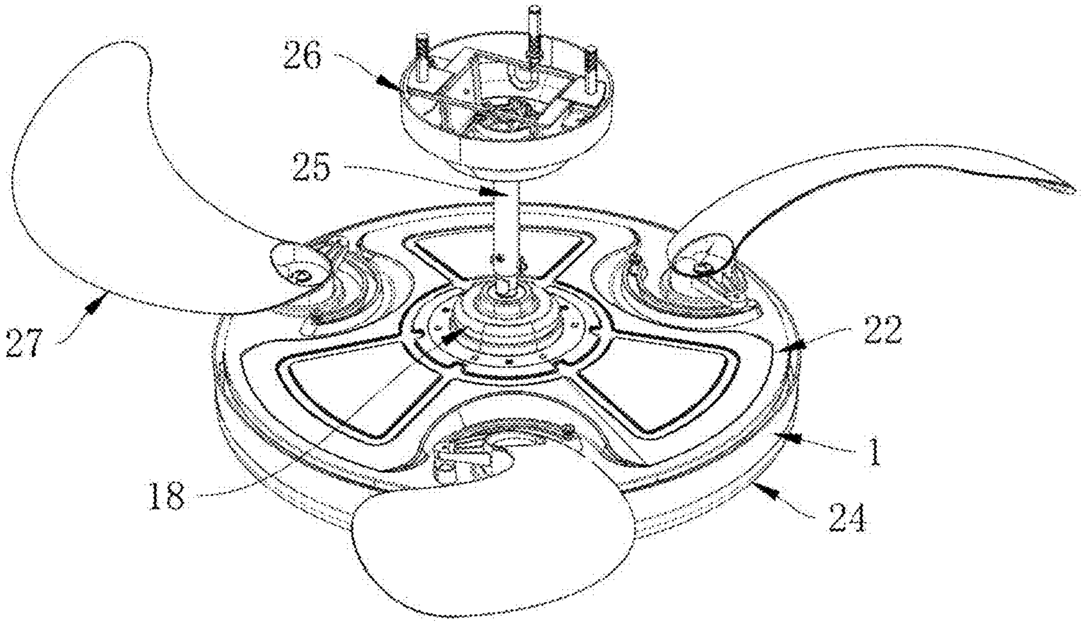
FIG. 1 is a schematic three-dimensional structural diagram of a fan lamp provided by the present disclosure.

The implementations of the present disclosure will be described in further detail below with reference to the accompanying drawings and examples. The following examples are used to illustrate the present disclosure, but are not intended to limit the scope of the present disclosure.

In the description of the examples of the present disclosure, it should be noted that the terms "center/central", "longitudinal", "horizontal", "upper", "lower", "front", "rear", "left", "right", "vertical", "horizontal", "top", "bottom", "inner", "outer", and the like indicate the orientation or positional relationship based on the orientation or positional relationship shown in the drawings, and are only for the convenience of describing the examples of the present disclosure and simplifying the descriptions, rather than indicating or implying that the devices or elements referred to must have a specific orientation or constructed and operated in a specific orientation, and therefore cannot be understood as a limitation on the examples of the present disclosure. Furthermore, the terms "first", "second", and "third" are used for descriptive purposes only and cannot be understood as indicating or implying relative importance.

In the description of the examples of the present disclosure, it should be noted that, unless otherwise clearly specified and limited, the terms "connected" and "connecting" should be understood in a broad sense. For example, it can be a fixed connection or a detachable connection, or integrated connection; it can be mechanical or electrical; it can be directly connected or indirectly connected through an intermediate medium. For those of ordinary skill in the art, the specific meanings of the above terms in the examples of the present disclosure can be understood on a specific basis.

In the examples of the present disclosure, unless otherwise clearly specified and limited, a first feature being "above" or "below" a second feature may mean that the first and second features are in direct contact, or the first and second features are in indirect contact through an intermediate medium. Furthermore, a first feature being "on", "above" and "over" a second feature may mean that the first feature is directly above or diagonally above the second feature, or simply means that the first feature has a horizontal height greater than that of the second feature. A first feature being "below", "beneath" and "under" a second feature may mean that the first feature is directly below or diagonally below the second feature, or simply mean that the first feature has a horizontal height smaller than that of the second feature.

In the description of this specification, reference to the description of the term "one example," "some examples," "an example," "a specific example," or "some examples," etc. means that the specific features, structures, materials or characteristics described in connection with the example are included in at least one example or examples of the present disclosure. In this specification, schematic representations of the above terms do not necessarily refer to the same example or example. Furthermore, the specific features, structures, materials or characteristics as described may be combined in any one or more examples or examples in a suitable manner. In addition, those skilled in the art can combine and integrate different examples or examples and features of different examples or examples described in this specification, unless they are mutually conflicting.

Reference numerals that are used in this disclosure may include:

1. lamp panel; 2. driving circuit board; 3. light source; 4. first baffle; 5. second baffle; 6. mounting groove; 7. dust-proof cover; 8. snap-fitting post; 9. snap-fitter; 10. Snap-fitting hole; 11. connecting plate; 12. connection disk; 13. backing plate; 14. driving shaft; 15. mounting cavity; 16. motor stator; 17. motor rotor; 18. first housing; 19. second housing; 20. bearing; 21. connecting portion; 22. housing cover; 23. annular plate; 24. lamp shade; 25. connecting rod; 26. ceiling assembly; 27. fan blade In some fan lamp products, a driving circuit board of the electric motor is mounted on a front surface of a lamp panel, that is, a side of the lamp panel where lamp beads are mounted. When users remove a lamp shade to clean the interior, they are easy to contact the driving circuit board, causing a risk of electric shock.

Examples of the present disclosure are described below with reference to FIGS. 1-4.

As shown in FIGS. 1 to 4, examples of the present disclosure provide a fan lamp, which mainly includes a driving mechanism, a lamp panel 1, a driving circuit board 2 and a light source 3. The driving mechanism is used to drive the fan lamp to rotate. The lamp panel 1 is connected to the driving mechanism. The driving circuit board 2 is mounted on the side of the lamp panel 1 facing towards the driving mechanism. The light source 3 is used for illumination and is mounted on the side of the lamp panel 1 facing away from the driving mechanism. The driving circuit board 2 is used to drive the light source 3 and the driving mechanism to be turned on and turned off.

In this example, the driving circuit board 2 is mounted on the side of the lamp panel 1 facing away from the light source 3, so that when opening the lamp shade 24 to clean the fan lamp, due to the blocking of the lamp panel 1, the driving circuit board 2 will not be contacted during the cleaning process, thus avoiding the risk of electric shock. Moreover, the light source 3 and the driving components of the driving mechanism are integrated on the driving circuit board 2, which reduces the number of the components, avoids occupying excessive mounting space, improves the aesthetics and reduces production costs.

Integrating the light source 3 and the driving components of the driving mechanism onto a single driving circuit board 2 can reduce the number of the circuit boards used in the fan lamp. The driving circuit board 2 is used to drive the light source 3 to be turned on or turned off to achieve illumination, and can also be used to drive the driving mechanism to be turned on or turned off to achieve air blowing.

Figure 2:
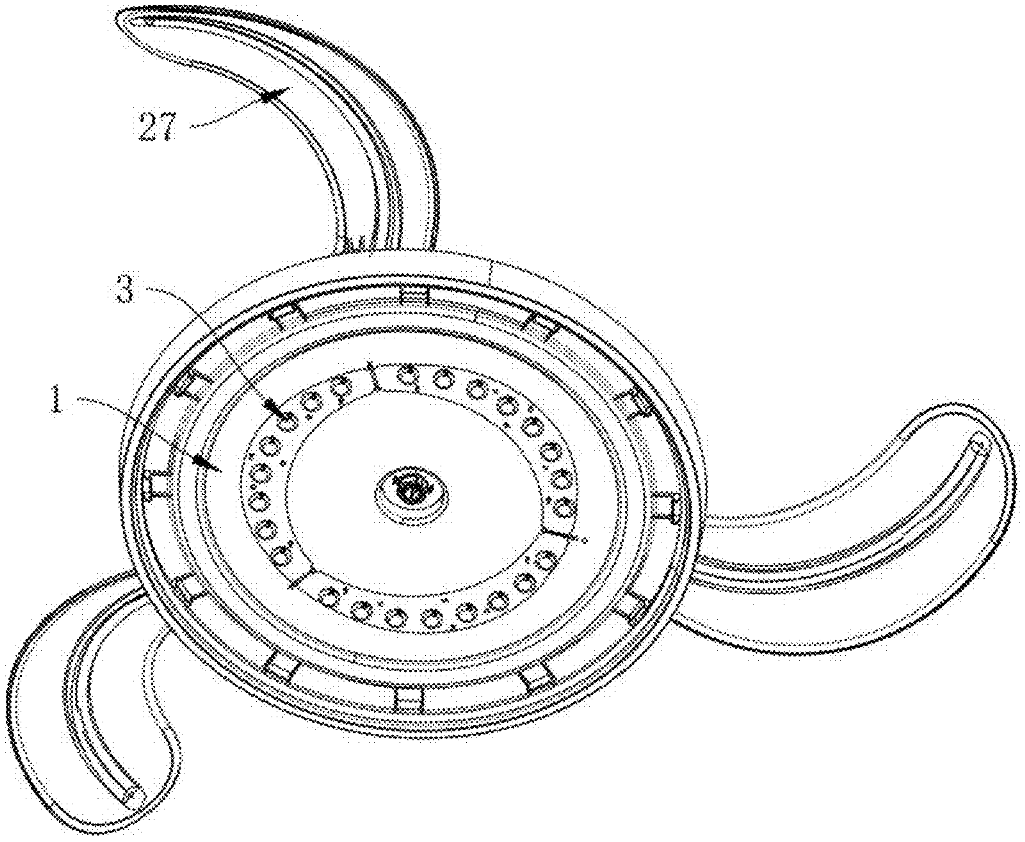
FIG. 2 is a partial three-dimensional structural schematic diagram of a fan lamp provided by the present disclosure.

As shown in FIG. 2, the light source 3 includes a plurality of LED light sources 3, and the plurality of light sources 3 are distributed in an annular shape around the center of the lamp panel 1.

According to the fan lamp provided by the present disclosure, an accommodating space is formed on the side of the lamp panel 1 facing towards the driving mechanism, and the driving circuit board 2 is mounted inside the accommodating space.

In one example, the side of the lamp panel 1 facing towards the driving mechanism is provided with a first baffle 4 and a second baffle 5 which are radially spaced apart, and the lamp panel 1 is formed with a mounting groove 6 as the accommodation space between the first baffle 4 and the second baffle 5, and the driving circuit board 2 is mounted in the mounting groove 6 and is adapted to be fixed to the bottom surface of the mounting groove 6 through a fastener.

Figure 3:
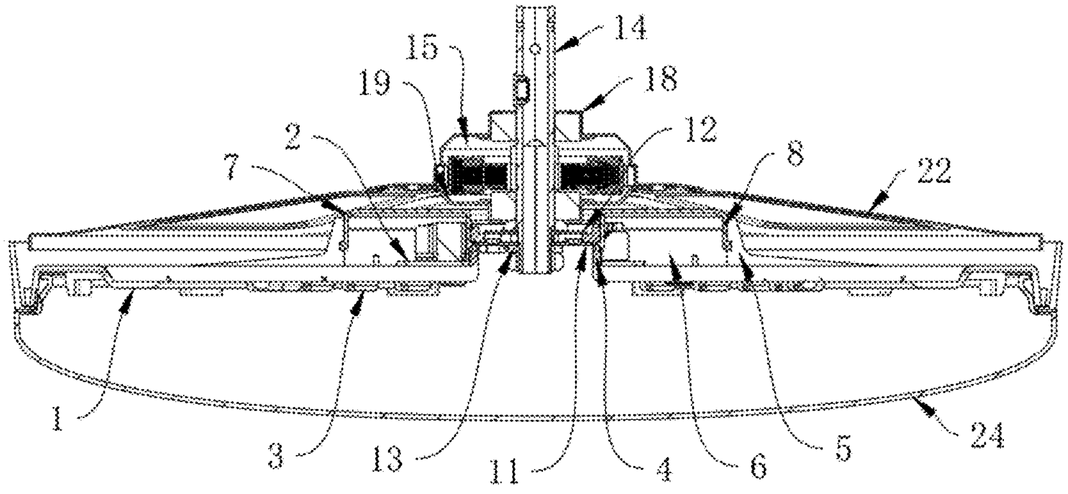
FIG. 3 is a cross-sectional view of a fan lamp provided by the present disclosure.

It can be understood that the lamp panel 1 can be formed with an annular mounting groove 6 between the first baffle 4 and the second baffle 5, the driving circuit board 2 is arranged in an annular shape, and the driving circuit board 2 is mounted in the annular mounting groove 6. As shown in FIG. 3, from this perspective, a mounting base is provided on the upper surface of the lamp panel 1, a mounting hole is constructed in the upper surface of the mounting base, and a mounting hole is also constructed in the driving circuit board 2. When the driving circuit board 2 is mounted in the mounting groove 6, the mounting hole of the driving circuit board 2 is aligned with the mounting hole of the lamp panel 1, and then fasteners are inserted to pass through the two mounting holes in sequence to fix the driving circuit board 2.

The fasteners may be screws. In this case, internal threads may be provided in the mounting holes, and the fasteners may be screwed into the two mounting holes in sequence to fix the driving circuit board 2. The fasteners can also adopt rivets and other structures, and the rivets can be directly riveted into the two mounting holes to fix the driving circuit board 2.

Fasteners are used to fix the driving circuit board 2, which enables the driving circuit board 2 to be detachably mounted, so that the driving circuit board 2 can be removed from the mounting groove 6 for inspection and maintenance.

The driving circuit board 2 can also be fixed to the upper surface of the lamp panel 1 by bonding or welding. In this case, the driving circuit board 2 is difficult to be removed from the mounting groove 6, and the driving circuit board 2 can be directly inspected in the mounting groove 6.

In another example, the driving circuit board 2 can also be fixed through the first baffle 4 or the second baffle 5. In the case where the first baffle 4 is used to fix the driving circuit board 2, by way of example, a receiving groove is provided on the side of the first baffle 4 facing towards the second baffle 5, and a limiting plate is rotatably mounted in the receiving groove, and the lower surface of the limiting plate is rotatably connected to the surface of the lower groove wall of the receiving groove or the upper surface of the lamp panel 1. When the driving circuit board 2 is placed in the mounting groove 6, the limiting plate is rotated to tightly press the driving circuit board 2 against the mounting groove 6, and then an L-shaped member can be snap-fitted with the receiving groove in such a manner that one side of the L-shaped member is snap-fitted with the receiving groove and the other side is abutted against the upper plate surface of the limiting plate, so as to achieve a fixed position of the limiting plate, thereby fixing the driving circuit board 2 onto the upper surface of the lamp panel 1.

In the case where a limiting plate is used to fix the driving circuit board 2, a positioning hole is also provided in the driving circuit board 2, and a positioning post is also provided on the upper surface of the lamp panel 1. Positioning cooperation is performed through the positioning post and the positioning hole to prevent the driving circuit board 2 from rotating, which facilitates positioning of the driving circuit board 2.

Of course, the limiting plate can also be fixed without using the L-shaped member. In such case, an accommodating groove can be provided on the side of the limiting plate facing towards the notch of the receiving groove, and a telescopic support rod is rotatably provided in the accommodating groove, and the lower end of the support rod is rotatably connected to the lower groove surface of the accommodating groove. At the same time, a positioning hole is provided in the upper groove surface of the receiving groove. When the limiting plate rotates, the lower surface of the limiting plate is abutted against the upper surface of the driving circuit board 2, and the support rod is rotated and extended, so that the extended end of the support rod is snap-fitted with the positioning hole. The support rod, the limiting plate and the first baffle 4 form a triangular structure to fix the driving circuit board 2.

In another example, a mounting hole can also be directly provided in the surface of the first baffle 4. After the driving circuit board 2 is placed in the mounting groove 6, the mounting hole is located above the driving circuit board 2, and the driving circuit board 2 is fixed through the L-shaped member. Specifically, a mounting hole is provided in one side of the L-shaped member, and the other side is used to be abutted against the driving circuit board 2. The mounting hole of the L-shaped member and the mounting hole of the first baffle 4 are aligned, and fasteners are inserted and pass through the two mounting holes to fix the position of the L-shaped member, so as to fix the driving circuit board 2 between the L-shaped member and the upper surface of the lamp panel 1.

A similar structure can also be provided on the side of the second baffle 5 facing towards the first baffle 4 to fix an inner ring part and an outer ring part of the driving circuit board 2 at the same time, so as to ensure the stable and reliable fixation of the driving circuit board 2.

In another example, a box for accommodating the driving circuit board 2 can also be provided separately. After the driving circuit board 2 is fixed in the box, the box is fixed to the side of the lamp panel 1 facing away from the light source 3, so that the mounting of the driving circuit board 2 can also be achieved.

The fan lamp provided according to the example of the present disclosure further includes a dust-proof cover 7, and the dust-proof cover 7 is adapted to be snap-fitted with the mounting groove 6. It can be understood that the driving mechanism of the fan lamp is capable of rotating, and there needs to be a certain gap between the driving mechanism and the lamp panel 1. This gap ensures that the driving mechanism can be rotated, but will allow dust to enter the cavity between the driving mechanism and the lamp panel 1 through the gap. When the dust touches the driving circuit board 2, it will not only affect the heat dissipation of the driving circuit board 2, but also can easily cause other safety hazards. In this example, a dust-proof cover 7 is provided to protect the mounting groove 6 from dust and prevent dust from entering the mounting groove 6, so as to achieve the effect of dust-proof protection.

The dust-proof cover 7 is fixed on the first baffle 4 or the second baffle 5 by snap-fitting, so that the mounting and disassembly of the dust-proof cover 7 are very convenient. The dust-proof cover 7 is fixed by snap-fitting, so that the dust-proof cover 7, the first baffle 4 and the second baffle 5 can all be made of insulating materials such as plastic, thereby improving the safety.

Figure 4:
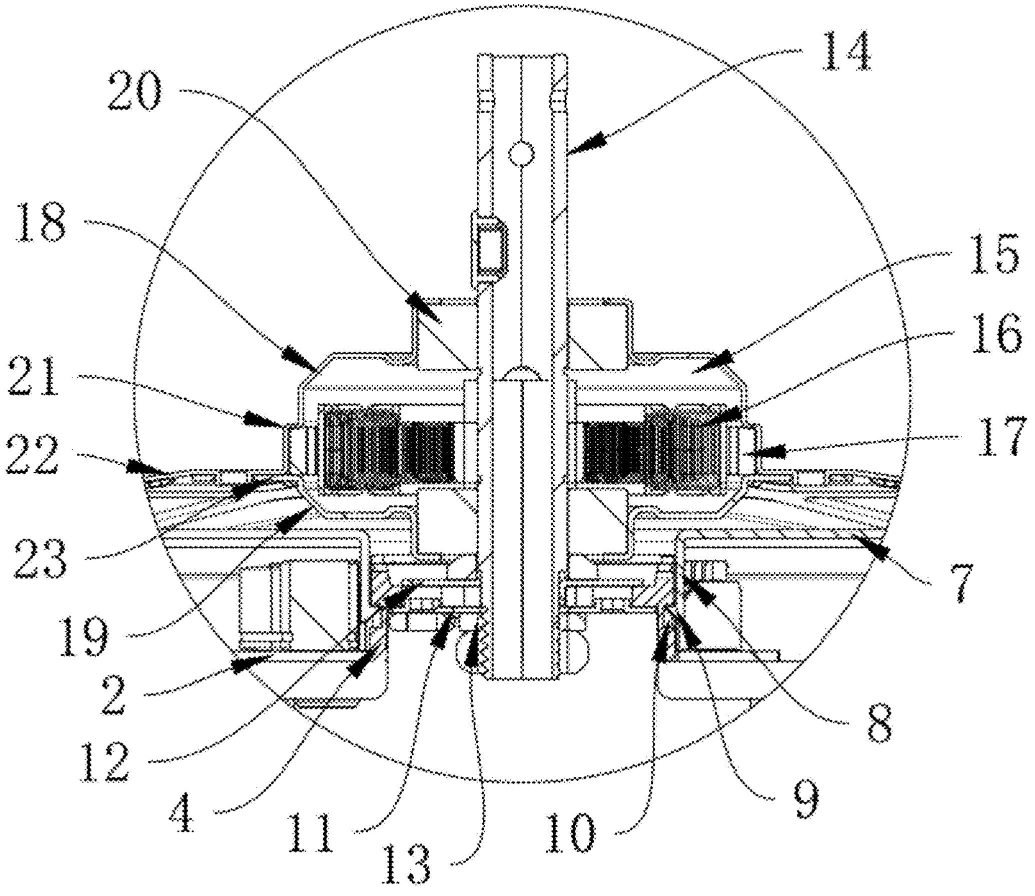
FIG. 4 is a partial cross-sectional view of a fan lamp provided by the present disclosure.

As shown in FIGS. 3 and 4, the dust-proof cover 7 has a snap-fitting post 8 extending in a direction towards the lamp panel 1, and the end of the snap-fitting post 8 is bent to form a snap-fitter 9, and the first baffle 4 or the second baffle 5 is formed with a snap-fitting hole 10, and the snap-fitter 9 is adapted to be snap-fitted with the snap-fitting hole 10. The dust-proof cover 7 is detachably mounted by snap-fitting the snap-fitter 9 of the snap-fitting post 8 into the snap-fitting hole 10.

The dust-proof cover 7 is also an annular structure, and the dust-proof cover 7 is provided with a flange in the direction towards the lamp panel 1. There are two flanges, namely an inner flange and an outer flange, and the inner flange is provided on the inner ring of the dust-proof cover 7, the outer flange is provided on the outer ring of the dust-proof cover 7, the side of the inner flange away from the dust-proof cover 7 is provided with an abutment plate, and the side of the outer flange away from the dust-proof cover 7 is also provided with an abutment plate. When the dust-proof cover 7 is connected with and closes the mounting groove 6, the inner flange and the abutment plate of the inner flange are abutted against the upper side of the first baffle 4, and the outer flange and the abutment plate of the outer flange are abutted against the upper side of the second baffle 5, so that the dust-proof cover 7 closes the notch of the mounting groove 6.

A plurality of snap-fitting posts 8 are provided and arranged at intervals on the dust-proof cover 7 along a circumferential direction. In the case where the snap-fitting posts 8 are arranged on the outer flange of the dust-proof cover 7 by way of example, the plurality of snap-fitting posts 8 are provided at intervals on the outer flange of the dust-proof cover 7 along the circumferential direction, and a plurality of snap-fitting holes 10 are provided at intervals on the inner surface of the second baffle 5. When the snap-fitters 9 of the plurality of snap-fitting posts 8 are respectively snap-fitted with the snap-fitting holes 10, the dust-proof cover 7 is fixed. Among them, in order to ensure that the snap-fitting post 8 can be moved properly, a gap is provided between the snap-fitting post 8 and the outer flange.

According to the fan lamp provided by the present disclosure, the first baffle 4 and the second baffle 5 are both arranged in such a manner that the axis lines of the first baffle 4 and the second baffle 5 are coincident with each other, and the second baffle 5 is located outside the first baffle 4. Among them, a mounting channel is formed inside the first baffle, and a connecting plate 11 is provided in the mounting channel, the connecting plate 11 closes the mounting channel, and the connecting plate 11 is adapted to be connected to the driving shaft 14 of the driving mechanism through fasteners.

The mounting channel of the hollow part inside the first baffle 4 can be closed through the connecting plate 11, and then the connecting plate 11 is used to connect the driving shaft 14 of the driving mechanism to achieve mutual fixation between the lamp panel 1 and the driving mechanism. As shown in FIG. 3, in this cross-sectional view, the connecting plate 11, the first baffle 4 and the lamp panel 1 substantially form a structure in the shape of Chinese character "几". Among them, the connecting plate 11, the first baffle 4 and the lamp panel 1 are integrally formed.

The connecting plate 11 is provided with a connecting disk 12 and a backing plate 13 on opposite sides respectively, and the connecting disk 12 and the backing plate 13 are sleeved on the driving shaft 14 of the driving mechanism and are adapted to fix the connecting disk 12, the connecting plate 11 and the backing plate 13 to the driving shaft 14 through fasteners. As shown in FIG. 4, the connecting disk 12 is arranged on the upper surface of the connecting plate 11, and the backing plate 13 is arranged on the lower surface of the connecting plate 11. The connecting plate 11 is protected and structurally reinforced by the connecting disk 12 and the backing plate 13.

Among them, the lower end of the driving shaft 14 can be provided with an external thread. After a washer is sleeved on the external thread of the driving shaft 14, the connecting disk 12, the connecting plate 11 and the backing plate 13 are sleeved onto the driving shaft 14 in sequence, and then locking nuts are used to lock and fix the positions of the connecting disk 12, the connecting plate 11 and the backing plate 13.

The thickness of the connecting disk 12 and the backing plate 13 can be selected according to actual usage requirements, and the shape of the backing plate 13 can be configured as a flat plate shape or a shape of Chinese character "几". At this time, the backing plate 13 can be attached with the connecting plate 11, the first baffle 4 and the lamp panel 1 to achieve the effect of good structural reinforcement.

According to the fan lamp provided by the example of the present disclosure, the driving mechanism includes a driving shaft 14, a housing, a motor stator 16 and a motor rotor 17. The housing is rotatably sleeved on the driving shaft 14, and a mounting cavity 15 is formed inside the housing. The motor stator 16 is sleeved on the driving shaft 14 and mounted inside the mounting cavity 15, and the motor stator 16 is electrically connected to the driving circuit board 2. The motor rotor 17 is rotatably sleeved outside the motor stator 16 and mounted inside the mounting cavity 15, and the motor rotor 17 is connected to the housing and used for driving the housing to rotate along the driving shaft 14.

The motor stator 16 is a coil winding, and the motor rotor 17 has a magnet. After the motor stator 16 is powered through the driving circuit board 2, the motor stator 16 can drive the motor rotor 17 to rotate. The rotation of the motor rotor 17 can drive the housing to rotate so as to achieve air blowing. The driving shaft 14 does not rotate and serves as a fixed shaft for fixedly connecting the motor stator 16.

The interior of the driving shaft 14 is hollow, which can facilitate routing of wires from the interior of the driving shaft 14. A clearance hole is provided in the driving shaft 14, so that the cable can pass through the driving shaft 14, then exit from the clearance hole and be connected to the driving circuit board.

As shown in FIG. 1, the upper end of the driving shaft 14 passes through the housing and is connected to a connecting rod 25. The upper end of the connecting rod 25 is provided with a ceiling assembly 26, and the fan lamp is fixed to the ceiling through the ceiling assembly 26.

As shown in FIG. 3, the housing includes a first housing 18 and a second housing 19, the first housing 18 is rotatably sleeved on the driving shaft 14, the second housing 19 is rotatably sleeved on the driving shaft 14, and the first housing 18 and the second housing 19 are aligned and joined with each other to form the aforementioned mounting cavity 15. The first housing 18 and the second housing 19 both have a bearing mounting area extending in a direction facing away from each other, and the bearing mounting area is adapted to receive a bearing 20, the inner ring of the bearing 20 is sleeved on the driving shaft 14, and the outer ring of the bearing 20 is connected to the first housing 18 and the second housing 19 respectively.

A bearing mounting area is formed for mounting the bearing 20, so that the bearing 20 is used to achieve the rotatable mounting between the first housing 18 and the driving shaft 14, and between the second housing 19 and the driving shaft 14. Among them, the first housing 18 and the second housing 19 are aligned and joined with each other by riveting.

The bearing 20 is a deep groove ball bearing, the inner ring of the bearing 20 has an interference fit or transition fit with the driving shaft 14, and the outer ring of the bearing 20 has an interference fit or transition fit with the first housing 18 or the second housing 19.

As shown in FIG. 1, a fan blade 27 is rotatably mounted on the upper surface of the housing cover 22. An arc-shaped adjustment groove is also provided on the upper surface of the housing cover 22. The fan blade 27 is slidably connected to the arc-shaped adjustment groove through a connecting piece. After sliding along the arc-shaped adjustment groove, the fan blade 27 can be entirely received above the housing cover 22, thereby facilitating transportation and aesthetics when the fan lamp is only used as a lighting fixture. Among them, the lower surface of the fan blade 27 is provided with a reinforcing rib for structural reinforcement of the fan blade 27.

According to the fan lamp provided by the example of the present disclosure, the side of the first housing 18 facing towards the second housing 19 is provided with a stepped connecting portion 21, and the housing cover 22 extends outwardly from the side of the connecting portion 21 facing towards the second housing 19. An annular plate 23 is provided on the side of the second housing 19 facing towards the first housing 18, and the annular plate 23 is attached with the housing cover 22 and is adapted to be fixed by fasteners. Among them, a snap-fitting slot is formed between the annular plate 23 and the connecting portion 21, and the motor rotor 17 is snap-fitted with the snap-fitting slot.

The motor rotor 17 is fixed between the stepped connecting portion 21 and the annular plate 23 of the second housing 19 to ensure reliable fixation of the motor rotor 17 and connect the motor rotor 17 to the first housing 18 and the second housing 19. When the motor rotor 17 rotates, the first housing 18 and the second housing 19 can be driven to rotate.

According to the fan lamp provided by the example of the present disclosure, the fan lamp further includes a lamp shade 24, and the lamp shade 24 is adapted to be snap-fitted at the side of the lamp panel 1 facing away from the driving mechanism.

The lamp shade 24 can play the roles of dustproof, protection, beautification and light control. The edge of the lamp panel 1 is adapted to have an annular member extending downwardly, and the edge of the lamp shade 24 has a snap-fitting portion extending upwardly, and the snap-fitting portion is adapted to be snap-fitted with the annular member. A pressing member is also provided on the lower surface of the lamp panel 1. A plurality of pressing members may be provided and arranged at intervals along a circumferential direction around the center of the lamp panel, and the plurality of pressing members all face towards the annular member, so that the snap-fitting portion is fixed between the pressing member and the annular member to ensure stable and reliable fixation of the lamp shade 24.

The present disclosure provides a fan lamp to solve the problem that the mounting method of the driving circuit board of the electric motor causes the risk of electric shock in the cleaning process, so as to ensure the safety of the cleaning process and reduce the risk of electric shock.

The present disclosure provides a fan lamp, including:

a driving mechanism that is configured to drive the fan lamp to rotate;

a lamp panel that is connected to the driving mechanism;

a driving circuit board that is mounted on a side of the lamp panel facing towards the driving mechanism; and a light source that is configured for illumination, the light source being mounted on a side of the lamp panel facing away from the driving mechanism;

wherein the driving circuit board is configured to drive the light source and the driving mechanism to be turned on and turned off According to the fan lamp provided by the present disclosure, an accommodating space is formed on the side of the lamp panel facing towards the driving mechanism, and the driving circuit board is mounted inside the accommodating space.

According to the fan lamp provided by the present disclosure, the side of the lamp panel facing towards the driving mechanism is provided with a first baffle and a second baffle which are radially spaced apart, and the lamp panel is formed with a mounting groove as the accommodation space between the first baffle and the second baffle, and the driving circuit board is mounted in the mounting groove and is adapted to be fixed to a bottom surface of the mounting groove through a fastener.

The fan lamp provided according to the present disclosure further includes a dust-proof cover, the dust-proof cover has a snap-fitting post extending in a direction towards the lamp panel, an end of the snap-fitting post is bent to form a snap-fitter, at least one of the first baffle and the second baffle is formed with a snap-fitting hole, and the snap-fitter is adapted to be snap-fitted with the snap-fitting hole.

According to the fan lamp provided by the present disclosure, the first baffle and the second baffle are both configured in an annular shape, axis lines of the first baffle and the second baffle are coincident with each other, and the second baffle is located outside the first baffle;

wherein a mounting channel is formed inside the first baffle, and a connecting plate is provided in the mounting channel, the connecting plate closes the mounting channel, and the connecting plate is adapted to be connected to a driving shaft of the driving mechanism through a fastener.

According to the fan lamp provided by the present disclosure, a connecting disk and a backing plate are respectively provided on opposite sides of the connecting plate, and the connecting disk and the backing plate are sleeved on the driving shaft and are adapted to fix the connecting disk, the connecting plate and the backing plate to the driving shaft through a fastener.

According to the fan lamp provided by the present disclosure, the driving mechanism includes:

a driving shaft;

a housing rotatably sleeved on the driving shaft, and a mounting cavity being formed inside the housing;

a motor stator sleeved on the driving shaft and mounted inside the mounting cavity, and the motor stator being electrically connected to the driving circuit board; and a motor rotor rotatably sleeved outside the motor stator and mounted inside the mounting cavity, and the motor rotor being connected to the housing and configured to drive the housing to rotate along the driving shaft.

According to the fan lamp provided by the present disclosure, the housing includes:

a first housing that is rotatably sleeved on the driving shaft;

a second housing that is rotatably sleeved on the driving shaft, the first housing and the second housing being aligned and joined with each other to form the mounting cavity;

the first housing and the second housing both have a bearing mounting area extending in a direction facing away from each other, and the bearing mounting area is adapted to be mounted with a bearing, and the bearing is sleeved on the driving shaft.

According to the fan lamp provided by the present disclosure, a side of the first housing facing towards the second housing is provided with a stepped connecting portion, a housing cover extends outwardly from a side of the connecting portion facing towards the second housing, and a side of the second housing facing towards the first housing is provided with an annular plate, wherein the annular plate is attached onto the housing cover and is adapted to be fixed by a fastener;

wherein a snap-fitting slot is formed between the annular plate and the connecting portion, and the motor rotor is snap-fitted with the snap-fitting slot.

The fan lamp provided according to the present disclosure further includes a lamp shade, and the lamp shade is adapted to be snap-fitted at the side of the lamp panel facing away from the driving mechanism.

In the fan lamp provided by the example of the present disclosure, the driving circuit board is mounted on the side of the lamp panel facing away from the light source so that when opening the lamp shade to clean the fan lamp, due to the blocking of the lamp panel, the driving circuit board will not be contacted during the cleaning process, thus avoiding the risk of electric shock. Moreover, the light source and the driving components of the driving mechanism are integrated on the driving circuit board, which reduces the number of components, avoids occupying excessive mounting space, improves the aesthetics and reduces production costs.

Finally, it should be noted that: the above examples are only used to illustrate the technical solution of the present disclosure, but not to limit it; although the present disclosure has been described in detail with reference to the foregoing examples, those of ordinary skill in the art should understand that they can still modify the technical solutions described in the foregoing examples, or make equivalent replacements for some of the technical features; while these modifications or substitutions do not cause the essence of the corresponding technical solution to deviate from the scope of the technical solution of various examples of the present disclosure.

The invention claimed is:

1. A fan lamp, comprising:

a driving mechanism that is configured to drive the fan lamp to rotate;

a lamp panel that is connected to the driving mechanism;

a driving circuit board that is mounted on a side of the lamp panel facing towards the driving mechanism; and a light source that is configured for illumination, the light source being mounted on a side of the lamp panel facing away from the driving mechanism; and wherein the driving circuit board is configured to drive the light source and the driving mechanism to be turned on and turned off, and wherein the side of the lamp panel facing towards the driving mechanism is provided with a first baffle and a second baffle which are radially spaced apart.

2. The fan lamp according to claim 1, wherein an accommodating space is formed on the side of the lamp panel facing towards the driving mechanism, and the driving circuit board is mounted inside the accommodating space.

3. The fan lamp according to claim 2, wherein the lamp panel is formed with a mounting groove as the accommodating space between the first baffle and the second baffle, and the driving circuit board is mounted in the mounting groove and adapted to be fixed to a bottom surface of the mounting groove through a fastener.

4. The fan lamp according to claim 3, further comprising a dust-proof cover, wherein the dust-proof cover has a snap-fitting post extending in a direction towards the lamp panel, an end of the snap-fitting post is bent to form a snap-fitter, at least one of the first baffle and the second baffle is formed with a snap-fitting hole, and the snap-fitter is adapted to be snap-fitted with the snap-fitting hole.

5. The fan lamp according to claim 3, wherein:

the first baffle and the second baffle are both configured in an annular shape, axial lines of the first baffle and the second baffle are coincident with each other, and the second baffle is located outside the first baffle; and a mounting channel is formed inside the first baffle, and a connecting plate is provided in the mounting channel, the connecting plate closes the mounting channel, and the connecting plate is adapted to be connected to a driving shaft of the driving mechanism through a fastener.

6. The fan lamp according to claim 5, wherein a connecting disk and a backing plate are respectively provided on opposite sides of the connecting plate, the connecting disk and the backing plate are sleeved on the driving shaft and adapted to fix the connecting disk, the connecting plate and the backing plate to the driving shaft through a fastener.

7. The fan lamp according to claim 2, wherein the driving mechanism comprises:

a driving shaft;

a housing that is rotatably sleeved on the driving shaft, and a mounting cavity being formed inside the housing;

a motor stator that is sleeved on the driving shaft and mounted inside the mounting cavity, and the motor stator being electrically connected to the driving circuit board; and a motor rotor that is rotatably sleeved outside the motor stator and mounted inside the mounting cavity, and the motor rotor being connected to the housing and configured to drive the housing to rotate along the driving shaft.

8. The fan lamp according to claim 7, wherein the housing comprises:

a first housing that is rotatably sleeved on the driving shaft; and a second housing that is rotatably sleeved on the driving shaft, the first housing and the second housing being aligned and joined with each other to form the mounting cavity; wherein the first housing and the second housing both have a bearing mounting area extending in a direction facing away from each other, and the bearing mounting area is adapted to be mounted with a bearing, and the bearing is sleeved on the driving shaft.

9. The fan lamp according to claim 8, wherein a side of the first housing facing towards the second housing is provided with a stepped connecting portion, and a housing cover extends outwardly from a side of the connecting portion facing towards the second housing, and a side of the second housing facing towards the first housing is provided with an annular plate, and the annular plate is attached with the housing cover and is adapted to be fixed through a fastener;

wherein a snap-fitting slot is formed between the annular plate and the connecting portion, and the motor rotor is snap-fitted with the snap-fitting slot.

10. The fan lamp according to claim 2, further comprising a lamp shade adapted to be snap-fitted at the side of the lamp panel facing away from the driving mechanism.

* * * * *